US008972704B2

(12) United States Patent
Koju et al.

(10) Patent No.: US 8,972,704 B2
(45) Date of Patent: Mar. 3, 2015

(54) CODE SECTION OPTIMIZATION BY REMOVING MEMORY BARRIER INSTRUCTION AND ENCLOSING WITHIN A TRANSACTION THAT EMPLOYS HARDWARE TRANSACTION MEMORY

(75) Inventors: Toshihiko Koju, Kawasaki (JP); Takuya Nakaike, Yokohama (JP); Ali Ijaz Sheikh, Markam (CA); Harold Wade Cain, III, Katonah, NY (US); Maged M. Michael, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 572 days.

(21) Appl. No.: 13/326,320

(22) Filed: Dec. 15, 2011

(65) Prior Publication Data

US 2013/0159678 A1 Jun. 20, 2013

(51) Int. Cl.
*G06F 9/52* (2006.01)
*G06F 9/30* (2006.01)
*G06F 9/46* (2006.01)
*G06F 9/38* (2006.01)

(52) U.S. Cl.
CPC ............ *G06F 9/522* (2013.01); *G06F 9/30087* (2013.01); *G06F 9/467* (2013.01); *G06F 9/30043* (2013.01); *G06F 9/3004* (2013.01); *G06F 9/3851* (2013.01); *G06F 9/466* (2013.01)
USPC ........... 712/220; 711/147; 711/150; 712/214; 712/225; 712/227; 712/E9.053; 717/159

(58) Field of Classification Search
CPC ....... G06F 9/52; G06F 9/30087; G06F 9/522; G06F 9/467; G06F 9/466
See application file for complete search history.

(56) References Cited

U.S. PATENT DOCUMENTS

| 7,865,885 | B2 | 1/2011 | Wu et al. | |
| 8,612,950 | B2* | 12/2013 | Shpeisman et al. | 717/151 |
| 2007/0143755 | A1* | 6/2007 | Sahu et al. | 718/100 |
| 2010/0005457 | A1 | 1/2010 | Komatsu et al. | |
| 2010/0169870 | A1 | 7/2010 | Dice | |
| 2012/0198214 | A1* | 8/2012 | Gadre et al. | 712/225 |

OTHER PUBLICATIONS

E. Borin et al., "TAO: Two-level atomicity for dynamic binary optimizations," Procs. of CGO'10, Apr. 24-28, 2010.
M. Herlihy, "Transactional memory: architectural support for lock-free data structures," Procs. of the 20th Annual International Symposium on Computer Architecture, 1993.
N. Neelakantam et al., "Hardware atomicity for reliable software speculation," Procs. of ISCA'07, Jun. 9-13, 2007.

* cited by examiner

*Primary Examiner* — Kenneth Kim
(74) *Attorney, Agent, or Firm* — Va ken Alexanian

(57) ABSTRACT

A code section of a computer program to be executed by a computing device includes memory barrier instructions. Where the code section satisfies a threshold, the code section is modified, by enclosing the code section within a transaction that employs hardware transactional memory of the computing device, and removing the memory barrier instructions from the code section. Execution of the code section as has been enclosed within the transaction can be monitored to yield monitoring results. Where the monitoring results satisfy an abort threshold corresponding to excessive aborting of the execution of the code section as has been enclosed within the transaction, the code section is split into code sub-sections, and each code sub-section enclosed within a separate transaction that employs the hardware transactional memory. Splitting the code section sections and enclosing each code sub-section within a separate transaction can decrease occurrence of the code section aborting during execution.

18 Claims, 5 Drawing Sheets

CODE SECTION OPTIMIZATION BY REMOVING MEMORY BARRIER INSTRUCTION AND ENCLOSING WITHIN A TRANSACTION THAT EMPLOYS HARDWARE TRANSACTION MEMORY

BACKGROUND

Computer code includes instructions that are organized in a particular order, and which are executed by a processor, such as a central processing unit (CPU), to perform desired functionality. It is usually presumed by the developer of the computer code that the instructions thereof will be executed in the order in which the instructions are presented. However, some types of processors and compilers optimize computer code to improve execution performance, and this optimization can result in out-of-order execution of the instructions.

While generally such out-of-order execution is not problematic, it can cause unpredictable behavior, particularly with respect to load and store instructions that are executed in relation to memory locations. If the contents of a memory location are loaded before desired contents are stored at this memory location, when it is expected that the desired contents will be stored before they are subsequently loaded, problems can arise such that the computer code does not perform its desired functionality. Therefore, processors and compilers can include mechanisms by which to enforce ordering constraints in the executions of instructions within computer code.

One such mechanism is a memory barrier instruction, which is also referred to as a memory barrier instruction, a membar, a memory fence, or a fence instruction. A memory barrier instruction prohibits instructions, such as load and store instructions, located after the memory barrier from being executed prior to instructions, such as load and store instructions, located before the memory barrier. For example, if a store instruction has to be executed prior to a load instruction, then a memory barrier instruction can be inserted somewhere between the store instruction and the load instruction. As such, unpredictable behavior in computer code execution can be avoided.

SUMMARY

A method of an embodiment of the invention includes receiving, by a processor, a code section of a computer program to be executed by a computing device. The code section includes one or more memory barrier instructions. The method includes determining, by the processor, whether the code section satisfies one or more thresholds. The method includes, responsive to determining that the code section satisfies the thresholds, modifying the code section. The code section is modified by the processor enclosing the code section within a transaction that employs hardware transactional memory of the computing device, such that an entirety of the code section is executed or none of the code section is executed. The code section is also modified by the processor removing the memory barrier instructions from the code section.

A computer program product of an embodiment of the invention includes a computer-readable storage medium having computer-readable code embodied therein. The computer-readable code is executable by a processor to modify a code section of a computer program to be executed by a computing device. The code section includes one or more memory barrier instructions. Modifying the code section includes enclosing the code section within a transaction that employs hardware transactional memory of the computing device, such that an entirety of the code section is executed or none of the code section is executed. Modifying the code section also includes removing the memory barrier instructions from the code section.

A system of an embodiment of the invention includes a processor, a storage device, and a software component. The storage device is to store a code section of a computer program to be executed by a computing device. The code section includes one or more memory barrier instructions. The software component is executable by the processor to modify the code section. The software component modifies the code section by enclosing the code section within a transaction that employs hardware transactional memory of the computing device, such that an entirety of the code section is executed or none of the code section is executed. The software component also modifies the code section by removing the memory barrier instructions from the code section.

BRIEF DESCRIPTION OF THE SEVERAL VIEWS OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background section, a memory barrier instruction is a mechanism to enforce the order of execution of instructions, particularly load and store instructions, within computer code. Instructions within the computer code before a memory barrier instruction are guaranteed to be executed before instructions within the computer code after the memory barrier instruction. Out-of-order execution can still occur among the instructions before the memory barrier instruction, as well as among the instructions after the memory barrier instruction, but instruction execution cannot cross the memory barrier.

A problem with memory barrier instructions, however, is that computationally they are typically very expensive to process. As such, performance degradation of the resulting computer code can result. For instance, execution of the computer code may degrade in performance, and/or compilation of the computer code may degrade in performance.

Techniques disclosed herein reduce usage of memory barrier instructions within computer code to avoid the performance degradation associated with their usage. Most generally, computer code that includes one or more memory barrier instructions is enclosed within a transaction that employs hardware transactional memory of a processor of a computing device, and the memory barrier instructions therein removed. Such hardware transactional memory ensures that load and store instructions within the computer code are executed atomically. That is, it is guaranteed that all the instructions (or specifically just load and store instructions) within the computer code are executed in order, or none of the instructions are executed. Where employing hardware transactional memory is less performance degrading than using memory barrier instructions is, performance can thus be improved.

Figure 1:
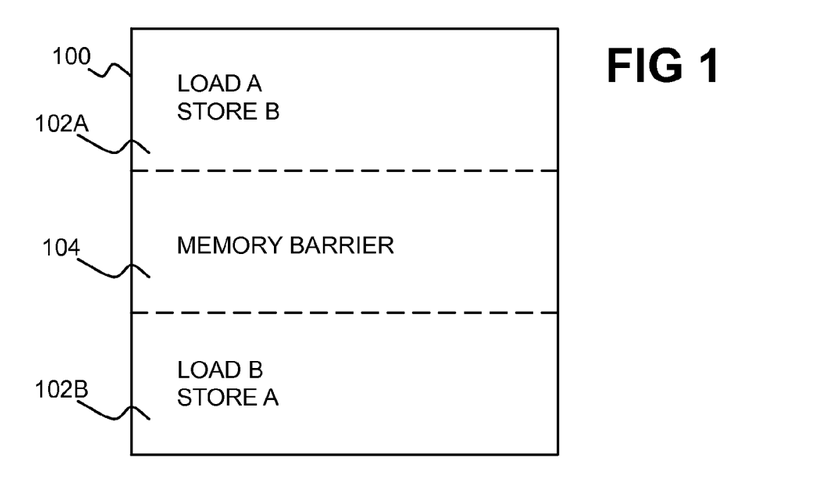
FIG. 1 is a diagram of an example code section that includes a memory barrier, according to an embodiment of the invention.

FIG. 1 shows an example code section 100 of a computer program to be executed by a processor of a computing device, according to an embodiment of the invention. The code section 100 includes a number of instructions 102A and a number of instructions 102B, which are collectively referred to as the instructions 102. The code section 100 further includes a memory barrier instruction 104. The instructions 102A include a load instruction to load the contents of memory location A, and a store instruction to store desired contents into memory location B. The instructions 102B include a load instruction to load the contents of memory location B, and a store instruction to store desired contents into memory location A.

Since the memory barrier instruction 104 is located between the instructions 102A and 102B, it is guaranteed that all the instructions 102B (or just the load and store instructions thereof) will not be executed prior to the instructions 102A (or just prior to the load and store instructions thereof). For example, it is guaranteed that the contents of memory location A will be loaded pursuant to the load instruction within the instructions 102A before desired contents are stored within memory location A pursuant to the store instruction within the instructions 102B. Likewise, it is guaranteed that desired contents of memory location B will be stored pursuant to the store instruction within the instructions 102A before contents of memory location B are loaded pursuant to the load instruction within the instructions 102B.

Figure 2:
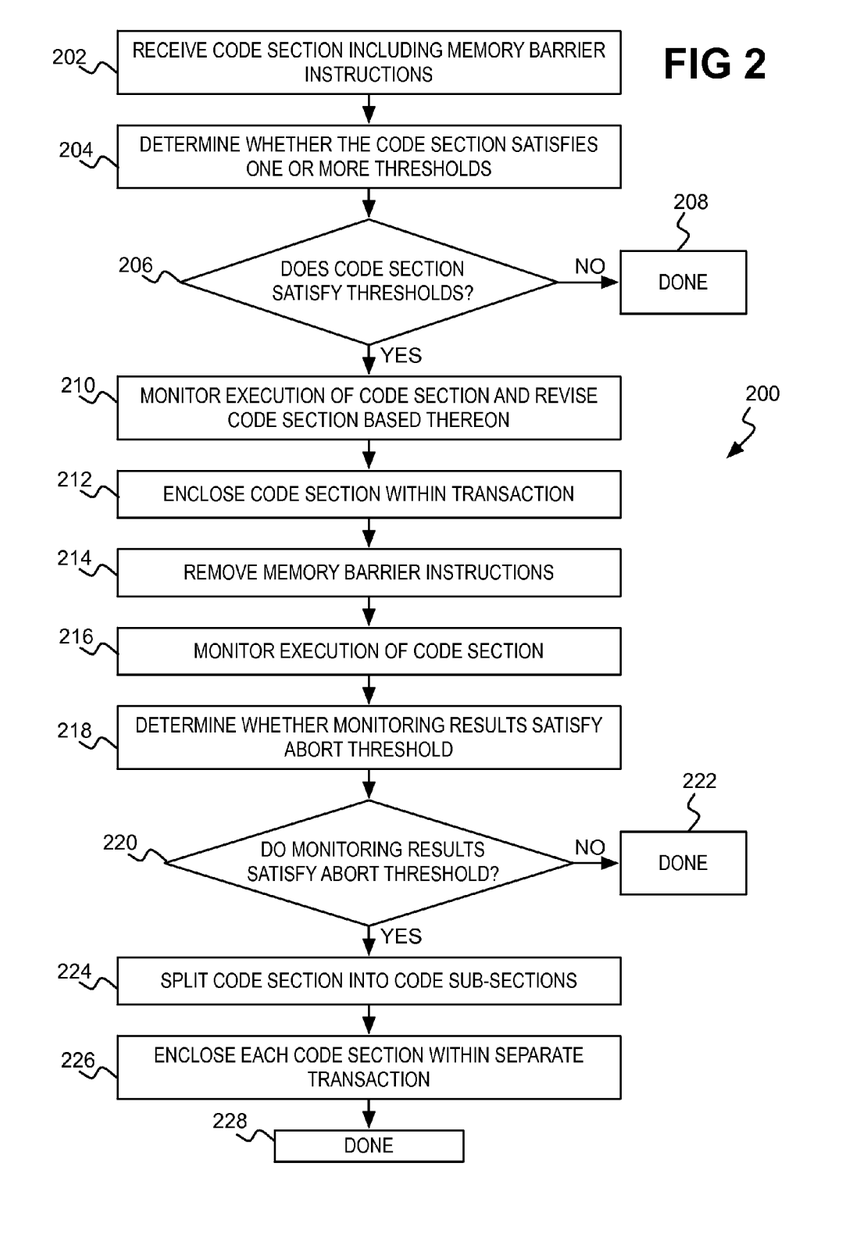
FIG. 2 is a flowchart of a method for optimizing a code section that includes one or more memory barriers, according to an embodiment of the invention.

FIG. 2 shows a method 200 for optimizing a code section that includes one or more memory barrier instructions so that execution and/or compilation performance is not degraded as a result of these memory barrier instructions, according to an embodiment of the invention. The method 200 is exemplarily described in relation to the example code section 100 of FIG. 1. However, more generally, the method 200 can be performed in relation to any code section that includes one or more memory barrier instructions. The method 200 can be performed by a processor of a computing device, which may be the same processor and/or computing device that is to execute the code section 100, or a different processor and/or computing device.

The method 200 receives the code section 100 of a computer program, where the code section 100 includes one or more memory barrier instructions, such as the memory barrier instruction 104 (202). The method 200 determines whether the code section 100 satisfies one or more thresholds (204). Threshold satisfaction is assessed to determine whether the code section 100 should be enclosed in a transaction and have its memory barrier instruction 104 removed. One threshold can be that an associated processing cost of employing hardware transactional memory of the computing device that is to execute the code section 100 is less than an associated processing cost of executing the memory barrier instruction 104 within the code section 100.

More specifically, executing the memory barrier instruction 104 has an associated processing cost. This processing cost may be the length of time needed to execute the code section 100 including the memory barrier instruction 104 as compared to the length of time needed to execute the code section 100 if the memory barrier instruction 104 were not present. Likewise, using the hardware transactional memory in lieu of the memory barrier instruction 104 has an associated processing cost. This processing cost may be the length of time needed to execute the code section 100 using the hardware transactional memory as compared to the length of time needed to execute the code section 100 if the hardware transactional memory were not employed (and the memory barrier instruction 104 not present). If the former processing cost is greater than the latter processing cost, then removal of the memory barrier instruction 104 from the code section 100 and utilization of the hardware transactional memory instead may be appropriate.

A second threshold can be that an estimated transaction size of a transaction enclosing the code section 100 to utilize the hardware transactional memory is less than a memory size of the hardware transactional memory. The hardware transactional memory of the processor and/or of the computing device including this processor that is to execute the code section 100 has a finite amount of memory. Enclosing the code section 100 within a transaction so that the instructions 102 are executed atomically results in a transaction having an (estimated) transaction size.

If this estimated transaction size is greater than the memory size of the hardware transactional memory, then the transaction will likely not be performed or executed correctly. Rather, an out-of-(hardware transactional) memory error may be thrown during performance or execution, resulting in the transaction being prematurely aborted instead of properly finishing. Therefore, utilization of the hardware transactional memory may be appropriate just if the estimated transaction size of the transaction-enclosed code section 100 is less than the memory size of the hardware transactional memory that will be used.

The estimated transaction size of the transaction can be determined based on the number of load and store instructions within the code section 100 enclosed by the transaction. The estimated transaction size can be improved (i.e., made more accurate) by not duplicatively counting load and store instructions to the same memory location. For example, if there are five such instructions relating to the same memory location, then the transaction size is estimated based on just one of these instructions, and not all five. The load and store instructions can be analyzed to determine whether they refer to the same memory location by using alias analysis techniques, for instance.

A third threshold can be that the code section 100 does not include any instructions 102 that call functions outside of the code section 100. Outside function calls within the code section 100 can cause the transaction in which the code section 100 is enclosed to abort, due to, for instance, an out-of- (hardware transactional) memory error. Therefore, utilization of the hardware transactional memory may be appropriate just if the code section 100 does not include any calls to functions that are external to the code section 100.

If the code section 100 does not satisfy the specified threshold(s) (206), then the method 200 is finished (208), and the code section 100 is not optimized to reduce performance degradation resulting from the memory barrier instruction 104. However, if the code section 100 satisfies the specified threshold(s) (206), then the method 200 optimizes the code section 100 to reduce performance degradation resulting from the memory barrier instruction 104. As an initial matter, execution of the code section 100 may be monitored, or profiled, and revised (210), so that the code section 100 is better optimized for subsequent enclosure within a transaction.

Monitoring or profiling of the code section 100 while the code section 100 still includes the memory barrier instruction 104 yields what are referred to herein as monitoring results. The monitoring results can include a more accurate estimation of the associated processing costs in executing the memory barrier instruction 104, as well as a more accurate estimation of the transaction size of the transaction needed to enclose the code section 100 were the memory barrier instruction 104 removed. The monitoring results can include the likelihood that memory conflicts will result when using a transaction, causing the transaction to prematurely abort instead of completing successfully. When a transaction prematurely aborts, the processor that provides the hardware transactional memory in question may save the reason why the transaction so aborted in an architectural register thereof, or within a special area within a storage device.

These monitoring results can be used in a number of different ways. First, the code section 100 can be revised to reduce the likelihood, for instance, that a transaction in which the code section 100 is enclosed will abort. For example, the code section 100 may be split into code sub-sections, as is described in detail later in the detailed description, in relation to parts 224 and 226 of the method 200. Second, it may be determined that in actuality the code section 100 does not satisfy the specified threshold(s), such that the code section 100 is indeed not a suitable candidate for enclosing within a transaction.

Other dynamic optimizations may be performed on the code section 100 in part 210 to decrease the resulting processing cost of enclosing the code section 100 within a transaction in lieu of using the memory barrier instruction 104. As one example, loops of instructions within the code section 100 may be unrolled and tiled. Loop unrolling and tiling packs multiple iterations of a loop into a single transaction. This can help ensure that the resulting estimated transaction size does not exceed the hardware transactional memory size.

The code section 100 is enclosed within a transaction employs the hardware transactional memory (212), and the memory barrier instructions, such as the memory barrier instruction 104, removed from the code section (214). Enclosing the code section 100 can include adding three instructions to the code section 100. A transaction-start instruction can be added prior to the first instruction within the code section 100. A transaction-end instruction can be added after the last instruction within the code section 100, and a transaction-abort instruction can replace one or more instructions 102 within the code section 100. The transaction-end instruction corresponds to non-exceptional normal exit from the code section 100—i.e., where the code section 100 is completely and properly executed, without throwing an exception.

By comparison, a transaction-abort instruction can replace the instructions 102 within the code section 100 that handle exceptional and abnormal exit from the code section 100—i.e., where the code section 100 is not completely and properly executed, and instead throws an exception. A transaction-abort instruction can be used to replace those instructions 102 that are rarely executed, to reduce the size of the code section 100. In this latter case, the monitoring results may indicate, for instance, which of the instructions 102 are rarely executed.

Figure 3:
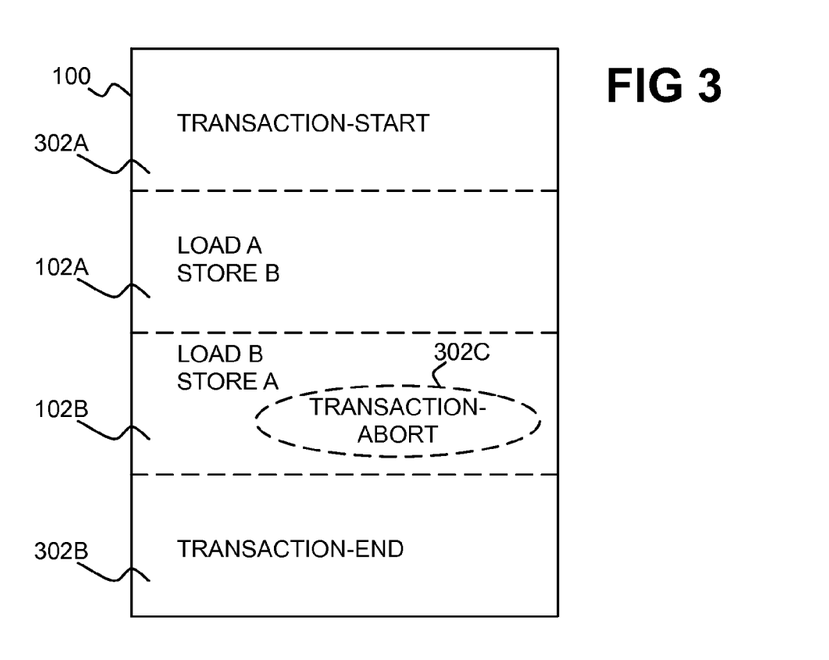
FIG. 3 is a diagram of the example code section of FIG. 1 after having its memory barrier removed and after having been enclosed within a transaction, according to an embodiment of the invention.

FIG. 3 shows the code section 100 of FIG. 1 after parts 212 and 214 of the method 200 have been performed, according to an embodiment of the invention. In FIG. 3, the memory barrier instruction 104 of FIG. 1 is no longer present within the code section 100, pursuant to part 214. Furthermore, three transaction-related instructions 302A, 302B, and 302C, collectively referred to as the transaction-related instructions 302, have been added to the code section 100, pursuant to part 212. Via addition of the transaction-related instructions 302 to the code section 100, it is said that the code section 100 has been enclosed within a transaction that employs the hardware transactional memory so that at least some of the instructions 102 are executed in an atomic manner.

The transaction-related instruction 302A is a transaction-start instruction that is added prior to the first instruction of the code section 100, and thus before the instructions 102A. The transaction-related instruction 302B is a transaction-end instruction that is added after the last instruction of the code section 100, and thus after the instructions 102B. The transaction-related instruction 302C is a transaction-abort instruction that replaces one or more of the instructions 102 (specifically one or more of the instructions 102B).

Referring back to FIG. 2, once the memory barrier instruction 104 has been removed from the code section 100, and the code section 100 has been enclosed within a transaction, execution of the resulting code section 100 can be monitored (216). Monitoring of the code section 100 after enclosure within a transaction and after removal of the memory barrier instruction 104 yields what are also referred to herein as monitoring results. However, these monitoring results should not be confused with those described in relation to part 210 above, which pertain to monitoring of the code section 100 prior to enclosure of the code section 100 within a transaction and when the code section 100 still includes the memory barrier instruction 104.

The monitoring results can indicate how often the code section 100 has thrown an exception when executed, and thus how often the code section 100 is not executing completely and properly. The monitoring results can further indicate why the code section 100 has had its execution aborted, each time such aborting occurs. An abort threshold is said to correspond to excessive aborting of the execution of the code section 100 as enclosed within a transaction. The abort threshold may encompass the number, frequency, and/or type of this aborting, against which the monitoring results are compared to determine whether the code section 100 should be optimized further, to decrease the occurrence of the code section 100 aborting during execution. As one example, if the code section 100 aborts a minimum number of times at a great enough frequency, and/or for any of one or more particular reasons, then the code section 100 is a candidate for additional optimization.

If the monitoring results do not satisfy the specified abort threshold (220), then the method 200 is finished (222), and the code section 100 is not optimized further. However, if the monitoring results satisfy the specified abort threshold (220), then the method 200 optimizes the code section 100 further to decrease the occurrence of the code section 100 aborting when executed. One such optimization includes splitting the code section 100 into a number of code sub-sections (224), and enclosing each code sub-section within its own separate transaction (226). Instead of there being an overarching single transaction that encompasses the entirety of the code section 100, therefore, there are a number of separate transactions that each encompass a portion, or sub-section, of the code section 100. The manner by which such splitting and re-enclosure is achieved can be performed in accordance with why the code section 100 itself is excessively aborting during execution, as is now described in detail with reference to two examples.

First, the monitoring results may indicate that a primary reason why the execution of the code section 100 as enclosed within a transaction is excessively aborting is that the actual transaction size of this transaction is (routinely) exceeding the memory size of the hardware transactional memory by which the transaction is effectuated. Although the method 200 may compare an estimated transaction size against the memory size of the hardware transactional memory in part 204, and enclose the code section 100 within a transaction just if this threshold is satisfied per part 206, the actual transaction size can in some cases be larger than the estimated transaction size. In such cases, the primary reason why execution of the transaction-enclosed code section 100 excessively aborts may therefore be that the actual transaction size is larger than the memory size of the hardware transactional memory.

In this first example, the code section 100 is split into code sub-sections such that all the instructions 102 of the code section 100 are included within the code sub-sections. Stated another way, each and every instruction 102 is included within one of the code sub-sections, and thus within one of the separate transactions that enclose the code sub-sections. There is no instruction 102 that is not part of the code sub-sections in this first example, and thus there is no instruction 102 that is not within one of the separate transactions that enclose the code sub-sections. Because the transactions enclosing the code sub-sections are smaller in size than the original single transaction encompassing the code section 100 in its entirety, the likelihood that an out-of-memory exception will be thrown in the future is reduced.

Figure 4:
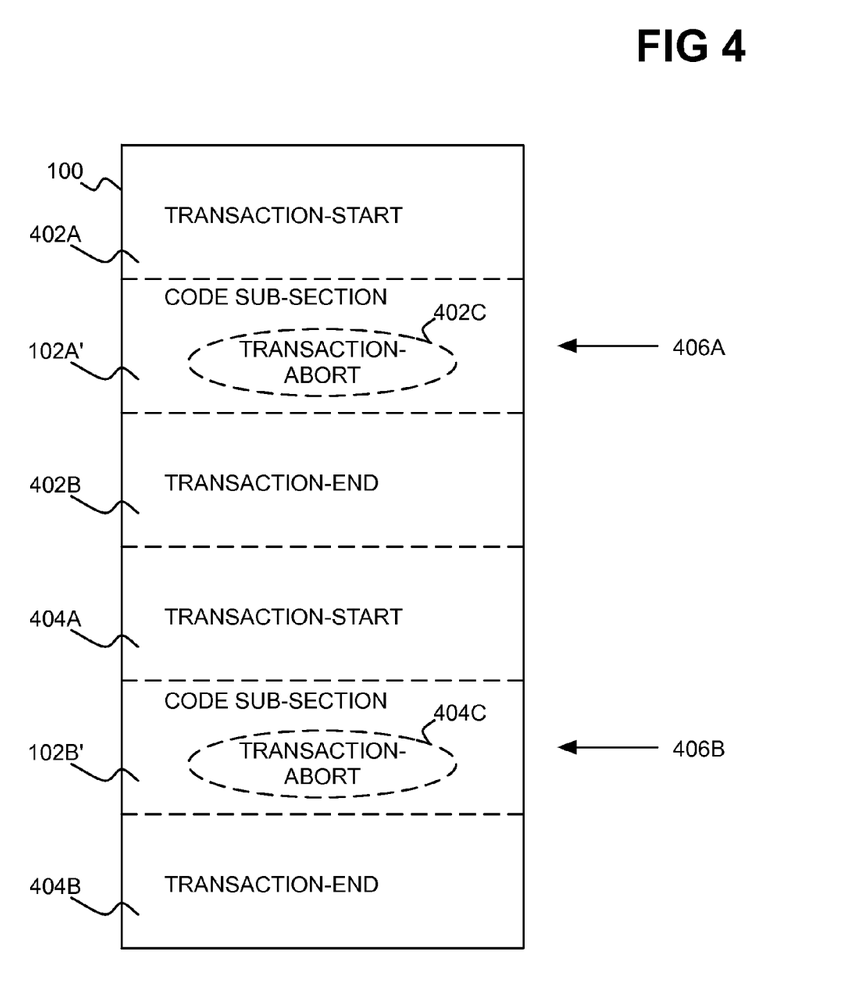
FIG. 4 is a diagram of the example code section of FIG. 3 after having been split to avoid excessive aborting during execution of the example code section, according to an embodiment of the invention.

FIG. 4 shows the code section 100 of FIG. 3 after parts 224 and 226 of the method 200 have been performed in accordance with this first example, according to an embodiment of the invention. In FIG. 4, the entirety of the code section 100 is not enclosed within a single transaction, such that the transaction-related instructions 302 have been removed from the code section 100 in FIG. 4. The code section 100 has been split into two code sub-sections 406A and 406B, which are collectively referred to as the code sub-sections 406. The code sub-section 406A includes some instructions 102A' of the code section 100, whereas the code sub-section 406B includes the remaining instructions 102B' of the code section 100. As such, all the instructions 102 of the code section 100 are part of the code sub-sections 406, and there is no instruction 402 that is not part of one of the code sub-sections 406.

The instructions 102 are delineated as the instructions 102A' and 102B' in FIG. 4 to denote that, although the instructions 102A' and 102B' represent all the instructions 102 of the code section 100, the instructions 102A' do not necessarily correspond to the instructions 102A of FIG. 1 and the instructions 102B' do not necessarily correspond to the instructions 102B of FIG. 1. That is, the code section 100 is not necessarily split so that the code sub-section 406A includes exactly just the instructions 102A and so that the code sub-section 406B includes exactly just the instructions 102B. For instance, the instructions 102A' may include all the instructions 102A and some of the instructions 102B, or the instructions 102B' may include all the instructions 102B and some of the instructions 102A.

The code sub-section 406A is enclosed within its own separate transaction, via the addition of three transaction-related instructions 402A, 402B, and 402C, which are collectively referred to as the transaction-related instructions 402, and which are a transaction-start instruction, a transaction-end instruction, and a transaction-abort instruction, respectively. Likewise, the code sub-section 406B is enclosed within its own separate transaction, via the addition of three transaction-related instructions 404A, 404B, and 404C, which are collectively referred to as the transaction-related instructions 404, and which are also a transaction-start instruction, a transaction-end instruction, and a transaction-abort instruction, respectively. The transactions enclosing the code sub-sections 406 in FIG. 4 are each smaller in transaction size than the single transaction enclosing the entire code section 100 in FIG. 3. As such, the likelihood that execution of the code section 100 will abort in the future due to out-of-(hardware transactional) memory exceptions is reduced.

Second, the monitoring results may indicate that a primary reason why the execution of the code section 100 as enclosed within a transaction is excessively aborting is that a particular instruction 102 of the code section 100 is causing a memory conflict. For instance, if the particular instruction 102 relates to a shared variable, the variable may be written to while the code section 100 is being executed atomically due to its enclosure within the transaction. In this case, execution of the transaction aborts.

In this second example, the code section 100 is again split into code sub-sections. However, not all the instructions 102 of the code section 100 are included within the code sub-sections. Specifically, the particular instruction 102 is not included within any code sub-section, and thus is not within any of the separate transactions that enclose the code sub-sections. Because the particular instruction 102 causing the memory exception is no longer part of a transaction, the likelihood that a memory except will be thrown in the future is reduced.

All the other instructions 102 except for such a particular instruction 102 causing a memory conflict can, however, be included within the code sub-sections, and thus within the separate transactions that enclose the code sub-sections. For instance, one of the code sub-sections into which the code section 100 has been split can be located immediately prior to the particular instruction 102 causing the memory conflict. Another of the code sub-sections into which the code section 100 has been split can be located immediately after the particular instruction 102 causing the memory conflict.

Figure 5:
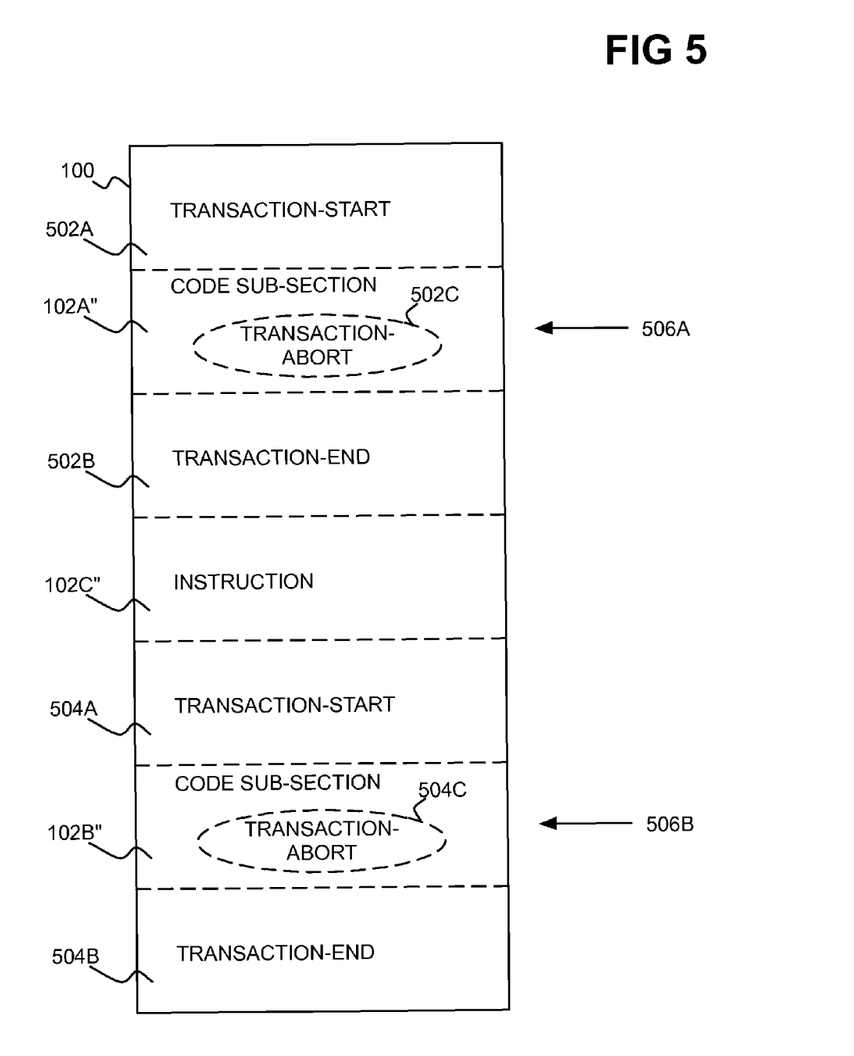
FIG. 5 is a diagram of the example code section of FIG. 3 after having been split to avoid excessive aborting during execution of the example code section, according to another embodiment of the invention.

FIG. 5 shows the code section 100 of FIG. 3 after parts 224 and 226 of the method 200 have been performed in accordance with this second example, according to an embodiment of the invention. In FIG. 5, the entirety of the code section 100 is not enclosed within a single transaction, such that the transaction-related instructions 302 have been removed from the code section 100 in FIG. 5, as in FIG. 4. The code section 100 has been split into two code sub-sections 506A and 506B, which are collectively referred to as the code sub-sections 506. The code sub-section 506A includes some instructions 102A'' of the code section 100, whereas the code sub-section 506B includes other instructions 102B" of the code section 100. The only instruction 102 of the code section 100 that is not part of either code sub-section 406 is the particular instruction 102C", which is the instruction 102 that is causing a memory conflict.

The instructions 102 are delineated as the instructions 102A", 102B", and 102C" in FIG. 5 to denote that, although the instructions 102A", 102B", and 102C" represent all the instructions 102 of the code section 100, the instructions 102A" do not necessarily correspond to the instructions 102A of FIG. 1 and the instructions 102B" do not necessarily correspond to the instructions 102B of FIG. 1. That is, the code section 100 is not necessarily split so that the code sub-section 506A includes exactly just the instructions 102A or that the code sub-section 506B includes exactly just the instructions 102B. Furthermore, the instructions 102A" or 102B" have to differ from the instructions 102A or 102B, respectively, because the instruction 102C" is within the instructions 102A or 102B.

The code sub-section 506A is enclosed within its own separate transaction, via the addition of three transaction-related instructions 502A, 502B, and 502C, which are collectively referred to as the transaction-related instructions 502, and which are a transaction-start instruction, a transaction-end instruction, and a transaction-abort instruction, respectively. Likewise, the code sub-section 506B is enclosed within its own separate transaction, via the addition of three transaction-related instructions 504A, 504B, and 504C, which are collectively referred to as the transaction-related instructions 504, and which are also a transaction-start instruction, a transaction-end instruction, and a transaction-abort instruction, respectively. The transactions enclosing the code sub-sections 506 in FIG. 5 do not include the instruction 102C", since as noted above the instruction 102C" is not part of either code sub-section 506A or 506B. As such, the likelihood that execution of the code section 100 will abort in the future due to a memory conflict is reduced.

As depicted in FIG. 5, the code sub-section 506A is located immediately prior to the instruction 102C" causing the memory conflict. Similarly, the code sub-section 506B is located immediately after the instruction 102C" causing the memory conflict. As such, in FIG. 5 there is no instruction 102, other than the instruction 102C" that is not within one of the code sub-sections 506 into which the code section 100 has been split.

Figure 6:
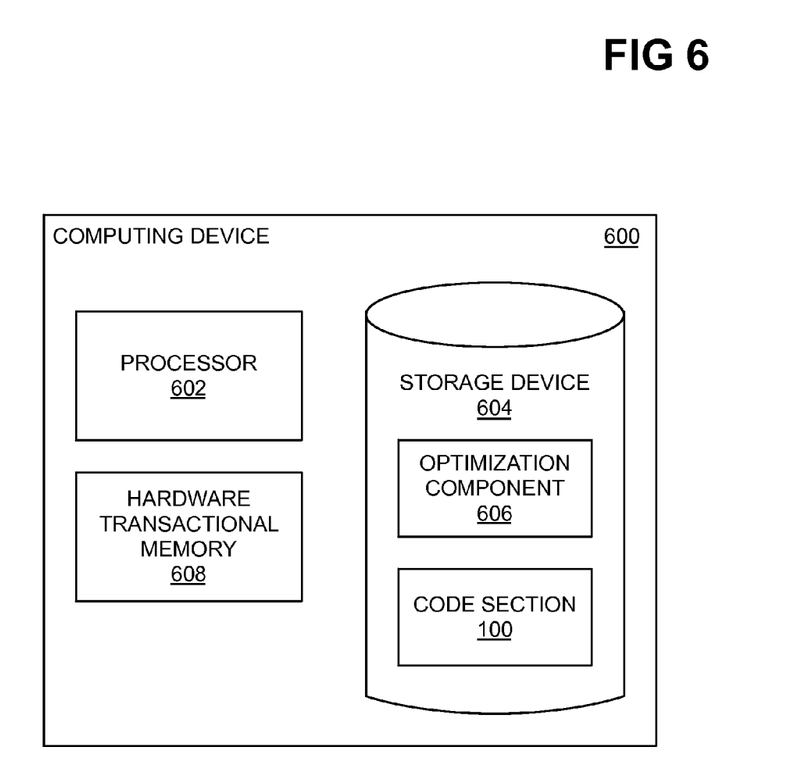
FIG. 6 is a diagram of a representative system, according to an embodiment of the invention.

FIG. 6 shows a representative computing device 600, according to an embodiment of the invention. The computing device 600 includes at least a processor 602 and a storage device 604 that stores at least an optimization component 606, which is a software component. The processor 602 thus executes the optimization component 606 from the storage device 604. The storage device 604 can be or include volatile memory, such as dynamic random-access memory, as well as non-volatile memory, such as flash memory or a hard disk drive, among other types of storage devices. Execution of the optimization component 606 causes the method 200 of FIG. 2 to be performed in relation to the code section 100.

As depicted in FIG. 6, the storage device 604 also stores the code section 100, and the computing device 600 also includes the hardware transactional memory 608 that supports execution of a transaction in an atomic manner, as has been described. In this implementation, then, the code section 100 is executed on the same computing device 600 on which the code section 100 is optimized by the optimization component 606. However, more generally, there can be another computing device that includes the hardware transactional memory 608 and that executes the code section 100. In this respect, FIG. 6 thus shows a representative system, which is implemented over one or more computing devices.

It is noted that, as can be appreciated by one those of ordinary skill within the art, aspects of the present invention may be embodied as a system, method or computer program product. Accordingly, aspects of the embodiments of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

In general, a computer program product includes a computer-readable medium on which one or more computer programs are stored. Execution of the computer programs from the computer-readable medium by one or more processors of one or more hardware devices causes a method to be performed. For instance, the method that is to be performed may be one or more of the methods that have been described above.

The computer programs themselves include computer program code. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

We claim:

1. A method comprising:
    receiving, by a processor, a code section of a computer program to be executed by a computing device, the code section including one or more memory barrier instructions;
    determining, by the processor, whether the code section satisfies one or more thresholds, each threshold comprising one of:
        a first processing cost being greater than a second processing cost, the first processing cost associated with execution of the memory barrier instructions, the second processing cost associated with employing the hardware transactional memory;
        an estimated transaction size of the transaction enclosing the code section being less than a memory size of the hardware transactional memory;
        the code section including no calls to functions outside the code section;
    responsive to determining that the code section satisfies the thresholds, modifying the code section by:
        enclosing, by the processor, the code section within a transaction that employs hardware transactional memory of the computing device, such that an entirety of the code section is executed or none of the code section is executed, the transaction being an enclosure within which the code section is enclosed; and,
        removing, by the processor, the memory barrier instructions from the code section.

2. The method of claim 1,
    wherein the thresholds comprise the second associated processing cost being less than the first associated processing cost.

3. The method of claim 1, wherein the thresholds comprise the estimated transaction size being less than the memory size.

4. The method of claim 1, wherein the threshold comprise the code section including no calls to functions outside of the code section.

5. The method of claim 1, wherein enclosing the code section within the transaction comprises:
    adding a transaction-start instruction prior to a first instruction within the code section;
    adding a transaction-end instruction after the last instruction within the code section, the transaction-end instruction corresponding to non-exceptional and normal exit from the code section; and,
    adding a transaction-abort instruction.

6. The method of claim 1, further comprising:
    monitoring, by the processor, execution of the code section as has been enclosed within the transaction, to yield monitoring results;
    determining, by the processor, whether the monitoring results satisfy an abort threshold, the abort threshold corresponding to excessive aborting of the execution of the code section as has been enclosed within the transaction;
    responsive to determining that the monitoring results satisfy the abort threshold:
        splitting the code section into a plurality of code sub-sections;
        enclosing each code sub-section within a separate transaction that employs the hardware transactional memory of the computing device,
    wherein splitting the code section into the code sub-sections and enclosing each code sub-section within a separate transaction are adapted to decreasing occurrence of aborting of the execution of the code section.

7. The method of claim 6, wherein splitting the code section into the code sub-sections comprises, where the monitoring results indicate that a primary reason why the execution of the code section as has been enclosed within the transaction is excessively aborting is that an actual transaction size of the transaction is exceeding a memory size of the hardware transactional memory,
   splitting the code section into the code sub-sections such that each instruction of all instructions of the code section is assigned to one of the code sub-sections.

8. The method of claim 6, wherein splitting the code section into the code sub-sections comprises, where the monitoring results indicate that a primary reason why the execution of the code section as has been enclosed within the transaction is excessively aborting is that a particular instruction of the code section is causing a memory conflict,
   splitting the code section into the code sub-sections such that the particular instruction is not assigned to any of the code sub-sections,
   such that the particular instruction is not part of any transaction that employs the hardware transactional memory,
   and such that one of the code sub-sections is located immediately prior to the particular instruction and is enclosed within a first separate transaction, and another of the code sub-sections is located immediately after the particular instruction and is enclosed within a second separate transaction.

9. The method of claim 1, wherein modifying the code section further comprises, prior to enclosing the code section within the transaction:
   monitoring, by the processor, execution of the code section to acquire information regarding the code section;
   revising, by the processor, the code section, based on the information acquired, so that the code section is better optimized for subsequent enclosure within the transaction.

10. A computer program product comprising a computer-readable storage medium having computer-readable code embodied therein and executable by a processor to modify a code section of a computer program to be executed by a computing device, the code section including one or more memory barrier instructions, wherein modifying the code section comprises:
    enclosing the code section within a transaction that employs hardware transactional memory of the computing device, such that an entirety of the code section is executed or none of the code section is executed, the transaction being an enclosure within which the code section is enclosed; and,
    removing the memory barrier instructions from the code section,
    wherein modifying the code section is responsive to the computer-readable code determining that the code section satisfies one or more thresholds, each threshold comprising one of:
      a first processing cost being greater than a second processing cost associated with execution of the memory barrier instructions, the second processing cost associated with employing the hardware transactional memory;
      an estimated transaction size of the transaction enclosing the code section being less than a memory size of the hardware transactional memory;
      the code section including no calls to functions outside the code section.

11. The computer program product of claim 10, wherein enclosing the code section within the transaction comprises:
    adding a transaction-start instruction prior to a first instruction within the code section;
    adding a transaction-end instruction after the last instruction within the code section, the transaction-end instruction corresponding to non-exceptional and normal exit from the code section; and,
    adding a transaction-abort instruction.

12. The computer program product of claim 10, wherein the computer-readable code is further executable by the processor to:
    monitor execution of the code section as has been enclosed within the transaction, to yield monitoring results;
    determine whether the monitoring results satisfy an abort threshold, the abort threshold corresponding to excessive aborting of the execution of the code section as has been enclosed within the transaction;
    responsive to determining that the monitoring results satisfy the abort threshold:
      split the code section into a plurality of code sub-sections;
      enclose each code sub-section within a separate transaction that employs the hardware transactional memory of the computing device,
    wherein splitting the code section into the code sub-sections and enclosing each code sub-section within a separate transaction are adapted to decreasing occurrence of aborting of the execution of the code section.

13. The computer program product of claim 12, wherein splitting the code section into the code sub-sections comprises:
    where the monitoring results indicate that a primary reason why the execution of the code section as has been enclosed within the transaction is excessively aborting is that an actual transaction size of the transaction is exceeding a memory size of the hardware transactional memory,
      splitting the code section into the code sub-sections such that each instruction of all instructions of the code section is assigned to one of the code sub-sections;
    where the monitoring results indicate that the primary reason why the execution of the code section as has been enclosed within the transaction is excessively aborting is that a particular instruction of the code section is causing a memory conflict,
      splitting the code section into the code sub-sections such that the particular instruction is not assigned to any of the code sub-sections, such that the particular instruction is not part of any transaction that employs the hardware transactional memory, and such that one of the code sub-sections is located immediately prior to the particular instruction and is enclosed within a first separate transaction, and another of the code sub-sections is located immediately after the particular instruction and is enclosed within a second separate transaction.

14. The computer program product of claim 10, wherein modifying the code section further comprises, prior to enclosing the code section within the transaction:
    monitoring execution of the code section to acquire information regarding the code section;
    revising the code section, based on the information acquired, so that the code section is better optimized for subsequent enclosure within the transaction.

15. A system comprising:
    a processor;
    a storage device to store a code section of a computer program to be executed by a computing device, the code section including one or more memory barrier instructions;
    a software component executable by the processor to modify the code section by:

enclosing the code section within a transaction that employs hardware transactional memory of the computing device, such that an entirety of the code section is executed or none of the code section is executed, the transaction being an enclosure within which the code section is enclosed; and, removing the memory barrier instructions from the code section, wherein the software component is to modify the code section responsive to determining that the code section satisfies one or more thresholds, each threshold comprising one of:

a first processing cost being greater than a second processing processing cost associated with execution of the memory barrier instructions, the second processing associated with employing the hardware transactional memory;

an estimated transaction size of the transaction enclosing the code section being less than a memory size of the hardware transactional memory;

the code section including no calls to functions outside the code section.

16. The system of claim 15, wherein the software component is to enclose the code section within the transaction by:

adding a transaction-start instruction prior to a first instruction within the code section;

adding a transaction-end instruction after the last instruction within the code section, the transaction-end instruction corresponding to non-exceptional and normal exit from the code section; and, adding a transaction-abort instruction.

17. The system of claim 15, wherein the software component is further to:

monitor execution of the code section as has been enclosed within the transaction, to yield monitoring results;

determine whether the monitoring results satisfy an abort threshold, the abort threshold corresponding to excessive aborting of the execution of the code section as has been enclosed within the transaction;

responsive to determining that the monitoring results satisfy the abort threshold:

split the code section into a plurality of code sub-sections;

enclose each code sub-section within a separate transaction that employs the hardware transactional memory of the computing device, wherein splitting the code section into the code sub-sections and enclosing each code sub-section within a separate transaction are adapted to decreasing occurrence of aborting of the execution of the code section.

18. The system of claim 17, wherein the software component is to split the code section into the code sub-sections by:

where the monitoring results indicate that a primary reason why the execution of the code section as has been enclosed within the transaction is excessively aborting is that an actual transaction size of the transaction is exceeding a memory size of the hardware transactional memory, split the code section into the code sub-sections such that each instruction of all instructions of the code section is assigned to one of the code sub-sections;

where the monitoring results indicate that the primary reason why the execution of the code section as has been enclosed within the transaction is excessively aborting is that a particular instruction of the code section is causing a memory conflict, split the code section into the code sub-sections such that the particular instruction is not assigned to any of the code sub-sections, such that the particular instruction is not part of any transaction that employs the hardware transactional memory, and such that one of the code sub-sections is located immediately prior to the particular instruction and is enclosed within a first separate transaction, and another of the code sub-sections is located immediately after the particular instruction and is enclosed within a second separate transaction.

* * * * *